3,215,516
MANUFACTURE OF FLAT GLASS
Lionel A. B. Pilkington, Rainhill, England, assignor to Pilkington Brothers Limited, Liverpool, England, a company incorporated of Great Britain
Filed Mar. 26, 1962, Ser. No. 182,437
Claims priority, application Great Britain, Mar. 29, 1961, 11,585/61
5 Claims. (Cl. 65—94)

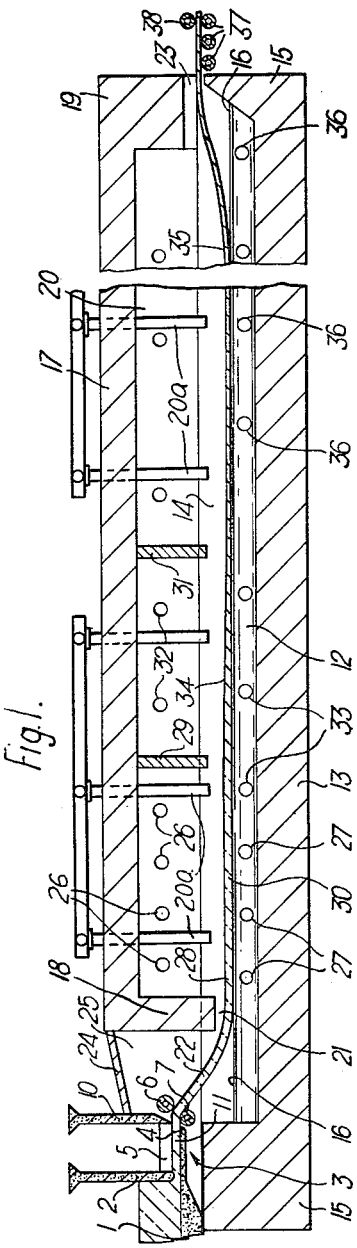

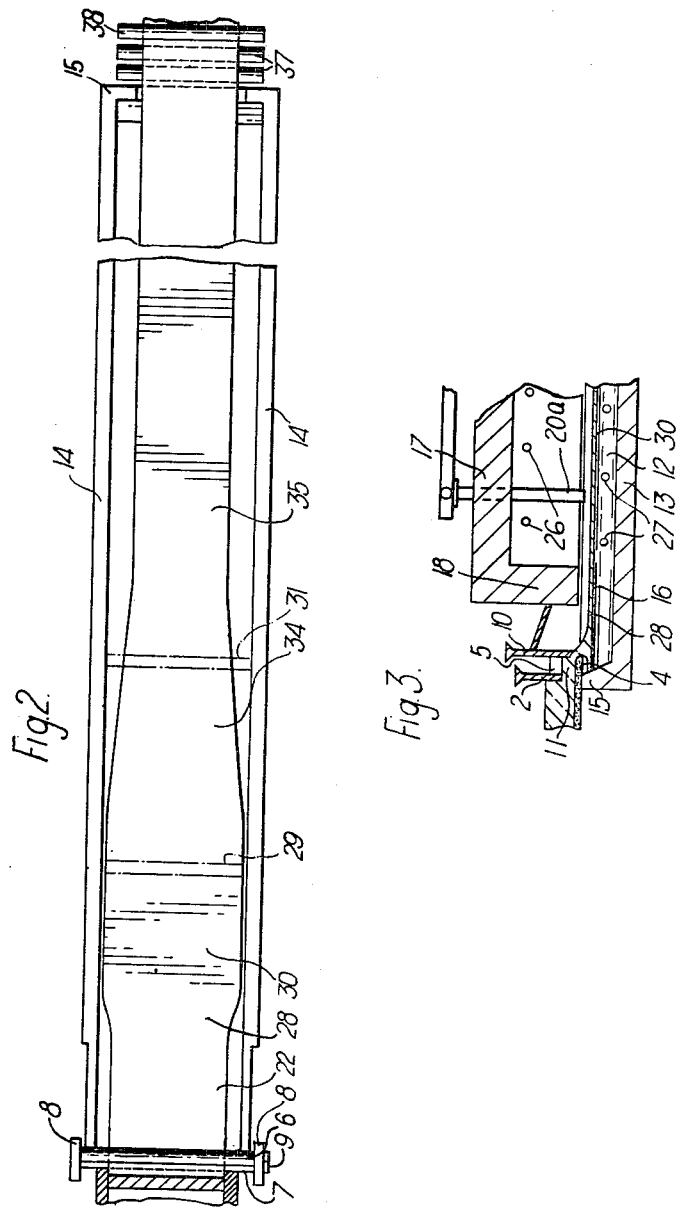

This invention relates to the manufacture of flat glass.

In the manner of manufacture of flat glass by the usual rolling methods imperfections on the roller surfaces are imparted to the surfaces of the glass as well as variations in thickness hereinafter sometimes referred to as distortions due to asymmetry in one or both of the rolls.

In the manufacture of a ribbon of glass by the usual vertical drawing methods the glass produced has a lustrous "fire finished" surface, but distortions occur in the drawn sheet as a result of local temperature differences before the sheet has set, and the process is slower than the rolling process.

The applicants herein have proposed another method of manufacturing flat glass having a lustre of a quality such as that known as "fire-finish" and which glass is free from distortions such as occur in either the known rolling or known drawing methods of producing glass in ribbon form, which proposed method comprises the steps of delivering glass at a controlled rate to a bath of molten metal and advancing the glass along the surface of the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath and sufficiently cooling this ribbon as it is advanced to permit it to be taken undamaged out of the bath by mechanical means.

A main object of the present invention is to facilitate the manufacture of flat glass having a lustre of a quality such as that known as "fire-finish" and which glass is free from distortions such as occur in either the known rolling or known drawning methods, whereby flat glass of different thicknesses can be produced.

According to the invention a method of manufacturing flat glass in ribbon form having a predetermined thickness, comprises the steps of delivering glass at a controlled rate to a molten bath and advancing the glass along the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, continually advancing the buoyant body of molten glass in ribbon form along the bath, gradually cooling the molten glass to a transitional plastic state in which the glass can be subjected to attenuation by the application of tractive force, said plastic state being such that applied tractive force is dissipated in the plastic glass, maintaining the glass in said plastic state as it is advanced, imposing a tractive force on the plastic glass whereby the ribbon in the plastic state is progressively decreased in thickness to a predetermined extent while maintaining the pristine flatness of the glass, stabilising the attenuated ribbon at the desired reduced thickness, and cooling the stabilised ribbon to permit it to be taken unharmed from the molten bath.

The transitional plastic state of the glass through which it passes during its advance, imparts such viscosity to the glass that surface tension and gravity no longer determine the thickness of the ribbon and applied tractive force is distributed in the plastic glass.

Preferably in carrying out the present invention the molten bath is so constituted as to have all the characteristics as fully described in the United States of America Patent No. 2,911,759.

The invention further comprehends apparatus for manufacturing flat glass in ribbon form having a predetermined width and thickness comprising, in combination, a tank containing a molten bath, and having an inlet to and an outlet from the bath, means for delivering glass at a controlled rate through the inlet to the bath and advancing the glass along the molten bath, temperature regulators associated with a first zone of the bath for maintaining thermal conditions in the glass on the bath which assure that a layer of molten glass is established on the bath and which then maintains said glass layer in molten condition until there is developed on the surface of the bath a buoyant body of molten glass of stable thickness by permitting said layer of molten glass to flow laterally unhindered to the limit of its free flow under the influence of gravity and surface tension, temperature regulators associated with a second zone of the bath to maintain thermal conditions in said second zone which gradually cool the molten glass to a plastic states as it is advanced, temperature regulators associated with a third zone of the bath to maintain thermal conditions in said third zone which stabilize and cool the plastic glass, and means for imposing a tractive force on the plastic glass as it passes through said second zone to cause controlled attenuation of the ribbon to said predetermined width and thickness before it is stabilised.

In order that the invention may be more clearly understood some preferred embodiments thereof will now be described, by way of example, with reference to the accompanying diagrammatic drawings in which:

FIGURE 1 is a sectional elevation of apparatus according to the invention comprising a tank structure confining a bath of molten metal, a roof structure over the tank structure and apparatus for delivering a rolled ribbon of glass at a controlled rate on to the bath surface, FIGURE 2 is a plan view of the tank structure of the apparatus illustrated in FIGURE 1, and FIGURE 3 is a part sectional elevation corresponding to FIGURE 1 and showing a modified method of delivering glass at a controlled rate to a bath of molten metal.

In the drawings like references indicate the same or similar parts.

Referring first to FIGURES 1 and 2 of the drawings:

In the drawings a forehearth of a continuous glass melting furnace is indicated at 1, a regulating tweel at 2, and a spout at 3, the spout comprising a floor or "lip" 4 and side jambs 5, the side jambs and lip forming a spout of generally rectangular cross section. A cover may be secured over the spout 3 in known manner.

Operatively associated with the spout 3 are a pair of water cooled casting rolls 6 and 7 which are mounted in side frames 8 and are driven through toothed wheels 9 by power means, not shown.

A gate 10 is adjustably suspended in a vertical plane in contiguity with the upper casting roll 6 and the gate 10 shields the roll 6 from heat radiated from molten glass 11 flowing from the forehearth 1 over the lip 4 of the spout 3 to the pass between the casting rolls 6 and 7.

The upper casting roll 6 is disposed slightly in advance of the lower casting roll 7 so that the molten glass 11 flows from the lip 4 on to the upper part of the roll 7 which thus presents to the glass 11 a downwardly and forwardly directed arcuate casting bed moving in the same direction as the direction of flow of the glass 11 along the spout. Thus the molten glass 11 on leaving the spout 3 and arriving on the lower casting roll 7 is constrained to flow forwardly thereby preventing backward flow of molten glass under the spout 3.

The ribbon forming means comprising casting rolls 6 and 7 just described is disposed over one end of a tank structure which contains a bath 12 of molten metal, for example molten tin. The tank comprises a floor 13, side walls 14 and end walls 15. The side walls 14 and end walls 15 are integral with each other and with floor 12. The level of the surface of the bath 12 of molten metal is indicated at 16 in FIGURE 1.

The tank structure supports a roof structure bridging the bath 12 and including a roof 17, end walls 18 and 19 and side walls 20 so that the roof structure provides a tunnel over the bath 12 and defines a head space over the bath into which head space non-oxidising gas is fed to prevent the formation in the metal bath of contaminants for the glass.

The end wall 18 at the inlet end of the tank extends downwardly into the tank structure and defines an inlet 21 through which a formed ribbon of glass 22 is delivered by the casting rolls 6 and 7 to the bath, and the end wall 19 of the roof structure at the outlet end of the tank defines with the end wall 15 of the tank an outlet 23 through which a cooled ribbon of glass of predetermined thickness is taken unharmed from the molten bath 12.

At the inlet end to the bath an extension 24 of the roof 17 is provided and forms with the gate 10 a chamber enclosing the casting rolls 6 and 7, this chamber further comprising side walls 25 carried by the side walls 14 of the tank.

The formed ribbon of glass 22 is delivered on to the surface of the bath 12 of molten metal at a controlled rate by the casting rolls 6 and 7, and the ribbon 25 is advanced along the surface of the bath into a first zone of the bath in which the thermal conditions maintained by temperature regulators, shown as heaters 26 mounted in the roof 17, and heaters 27 immersed in the bath, assure that the ribbon 22 is melted and a layer 28 of molten glass is thereby established on the bath. The first zone on the bath is defined by the inlet end wall 18 of the roof structure and by a refractory partition 29 extending across the tank structure and downwardly from the roof 17 and as the glass passes through this first zone it changes into molten condition at such a temperature that it flows laterally unhindered to the limit of its free flow under the influence of gravity and surface tension, until there is developed on the surface of the bath 12 a buoyant body 30 of molten glass of stable equilibrium thickness but of a width greater than that of the ribbon taken from the bath, the stable thickness being achieved when the lateral flow ceases, i.e. when a stable of equilibrium has been established, or substantially so, between the forces of surface tension of the molten glass and the molten metal and the forces of gravity.

The configuration of the tank at the level 16 of the bath surface, and the rate of delivery of glass on to the bath in the form of the rolled ribbon 22, are related so that the sides of the buoyant body 30 never reach the side walls 14 of the tank, and remain spaced therefrom as shown in FIGURE 2.

The thermal regulators 27 immersed in the bath 12 in the first zone maintain a temperature of the molten metal in this zone at about 1,000° C. or higher, and the length of the zone is sufficient to permit the molten layer 28 formed from the hibbon 22 to develop into the buoyant body 30 of molten glass of equilibrium thickness.

From the first zone the bouyant body 30 of molten glass is continually advanced in ribbon form along the bath surface into a second zone defined between the refractory partition 29 and a second refractory partition 31 which also extends across the tank structure and downwardly from the roof 17. Heaters 32 are mounted in the head space over the bath in this second zone and temperature regulators 33 are immersed in the bath to maintain a temperature gradient in this second zone such that the molten glass 30 is gradually cooled to a transitional plastic state as it is advanced through this zone.

When the glass is in the transitional plastic state its dimensions are no longer controlled by the forces of surface tension and gravity, so that the plastic glass 34 in the second zone can be subjected to controlled attenuation in the manner hereinafter described, by imposing a tractive force longitudinally on the plastic glass. The temperature of the glass in the region of the first partition 29 is about 850° C., and the temperature in the region of the second partition is about 700° C. when treating a soda-lime glass, so that the ribbon of glass 35 emerging under the second partition 31 is sufficiently stiff to hold its shape, that is its dimensions are stabilized. Thereafter in a third zone of the bath defined between the partition 31 and the end wall 19 of the roof structure, the stabilised ribbon 35 is cooled to about 650° C. when it reaches the outlet end of the bath, to permit the ribbon to be taken unharmed from the bath.

From the foregoing it will be observed that the second zone is enclosed in a chamber formed between the roof 17 and the tank structure by the partitions 29 and 31, the first zone is enclosed by a similar chamber between the wall 18 of the roof structure and the partition 29, the partition 31 and the end wall 19 forming a third chamber enclosing the third zone.

Thermal regulators 36 immersed in the molten bath in the third zone, regulate the temperature of the metal bath by creating a temperature gradient such that the stabilised ribbon emerging under the partition 31 is progressively cooled to a temperature to permit it to be taken unharmed from the molten bath 12 by driven rollers 37 disposed at the outlet end of the tank and slightly above the level of the bottom of the outlet 23. Superimposed driven rollers 38 co-operate with the rollers 37 at the entry to a lehr (not shown) to apply a tractive effort to the ribbon of glass 35 which tractive effort is transmitted by the stabilised and cooled ribbon 35 back to the plastic glass 34 in the second zone of the bath.

This tractive effort from the lehr is sufficient to maintain the ribbon moving along the bath, and also to apply the tractive force required to accelerate the plastic glass 34 and so to cause controlled attenuation of the plastic glass. The tractive force is ultimately dissipated in the plastic glass although molten glass in the bouyant body 30 may be accelerated as it flows under the partition 29, so that there may be a tapering of the width of the downstream end of the buoyant body 30 although its stable equilibrium thickness will be maintained. The controlled attenuation of the plastic glass causes progressive decrease in its width and thickness to a predetermined extent exemplified by the tapering form of the glass 34 shown in FIGURE 2.

The dimensions of the formed ribbon 22 and its rate of delivery to the bath are such that the buoyant body 30 of stable thickness is constantly maintained on the bath despite the acceleration of the plastic glass as a tractive force is imposed on it in the second zone.

The dimensions of the attenuated ribbon of glass are stabilised as the glass advances in ribbon form from under the partition 31, and when the glass is in the stabilised condition it cannot be further attenuated by the applied tractive force so that the width and thickness of the ribbon of glass 35 taken from the bath are of the predetermined dimensions and are determined by the length of the second zone and the magnitude of the tractive force.

The buoyant equilibrium body 30 of molten glass has a uniform thickness and flat parallel surfaces and the pristine flatness of this buoyant body of glass is maintained in the ribbon 34 as it is attenuated in the second zone of the bath, so that the ribbon 35 emerging from the bath is free from distortion, has flat parallel surfaces and a fire finish lustre.

Instead of regulating the delivery of glass to the bath by feeding a ribbon of glass of predetermined dimensions to the bath at a controlled rate, glass in molten form may be supplied direct to the bath from the spout 4 of the forehearth 1. Such a construction is illustrated in FIGURE 3, and the gate 10 in this construction controls the rate at which molten glass is delivered to the bath 12 to form the layer 28 of molten glass on the bath.

By the herein described method of controlled attenuation of a ribbon of equilibrium glass which ribbon is gradually cooled to a transitional plastic state and then attenuated, the production is facilitated of flat glass having all the advantages of equilibrium glass, namely a lustre of a quality such as that known as "fire-finish" and freedom from distortions such as occur in the known rolling or drawing methods, while flexibility of manufacture is provided by the facility for regulating the thickness of the glass produced.

Further, the invention comprehends a ribbon of glass produced by the above described method and a sheet of glass cut therefrom.

The invention also comprehends as a new composition of matter a defined ribbon of glass including as co-existing cohering successive sections, a liquid section in a state of equilibrium, a plastic section of progressively narrowing form, and a stiffened section having the same width as that of the narrow end of the plastic section.

I claim:

1. A method of manufacturing flat glass in ribbon form having a predetermined thickness, comprising the steps of delivering glass at a controlled rate to a bath of molten metal and advancing the glass along the bath under thermal conditions which assure that a buoyant layer of molten glass is established on the bath, maintaining the viscosity of said glass layer low enough for the glass to flow laterally unhindered to the limit of its free flow under the influence of gravity and surface tension, continually advancing the buoyant layer of molten glass so formed in ribbon form along the bath, gradually cooling said buoyant layer of molten glass to a transitional plastic state as it is advanced in which state the dimensions of the glass are no longer controlled by gravity and surface tension, imposing a tractive force on the plastic glass to attenuate it while permitting unrestrained inward movement of its edges as it is thus attenuated so that the pristine flatness of the glass achieved in said buoyant layer is maintained, thermally conditioning the glass as it is attenuated to maintain the glass in said plastic state for a sufficient distance down the bath to enable the desired progressive decrease in width and thickness of the ribbon in the plastic state to be effected and to stabilize the ribbon at the desired reduced thickness, while the pristine flatness of the glass is maintained, and cooling the stabilized ribbon to permit it to be taken unharmed from the molten bath.

2. A method of manufacturing flat glass according to claim 1, in which a formed ribbon of glass of predetermined dimensions is delivered to the molten bath at a controlled rate and the ribbon is advanced along the bath under thermal conditions which ensure the formation of said layer of molten glass.

3. A method of manufacturing flat glass according to claim 1, in which molten glass is poured onto the bath at a controlled rate so as to advance the glass on the bath to form said layer of molten glass on the bath.

4. A method according to claim 1, of manufacturing flat glass of soda-lime composition in which said layer of molten glass is maintained at a temperature above 850° C. to permit the molten glass to flow laterally unhindered to the limit of its free flow under the influence of gravity and surface tension, the molten glass is progressively cooled to a temperature in the range from 850° C. to 700° C. at which temperature it is in the aforesaid plastic state and can be subjected to controlled attenuation, and the attenuated ribbon is then stabilised by cooling it below 700° C.

5. A method of manufacturing flat glass according to claim 1, in which tractive force is imposed on the plastic glass by a tractive effort applied to the stabilised ribbon of glass at the discharge end of the bath.

References Cited by the Examiner

UNITED STATES PATENTS

| | | | |
|---|---|---|---|
| 710,357 | 9/02 | Heal | 65—258 |
| 1,489,852 | 4/24 | Rowley | 65—91 |
| 2,618,012 | 11/52 | Milne | 65—200 X |
| 2,911,759 | 11/59 | Pilkington et al. | 65—65 |
| 3,083,551 | 4/63 | Pilkington | 65—99 X |

DONALL H. SYLVESTER, *Primary Examiner.*